United States Patent [19]
Geiger

[11] 3,947,065
[45] Mar. 30, 1976

[54] AIR DEFLECTOR FOR USE IN COMBINATION WITH A VEHICLE PULLING A TRAILER

[75] Inventor: Robert G. Geiger, Elkhart, Ind.

[73] Assignee: Air-Flo Company, Inc., Elkhart, Ind.

[22] Filed: Oct. 2, 1974

[21] Appl. No.: 511,247

[52] U.S. Cl. ................................................. 296/1 S
[51] Int. Cl.² ..................... B60J 9/04; B62D 35/00
[58] Field of Search ....... 296/1 S, 91; 105/2 R, 2 A; 248/240

[56] References Cited
UNITED STATES PATENTS

| | | | |
|---|---|---|---|
| 3,233,745 | 2/1966 | Hershberger | 248/240 |
| 3,596,974 | 8/1971 | Adams | 296/1 S |
| 3,695,673 | 10/1972 | Meadows | 296/1 S |
| 3,794,372 | 2/1974 | Webb | 296/1 S |
| 3,819,222 | 6/1974 | Woodard | 296/1 S |
| 3,822,910 | 7/1974 | Wiley, Jr. | 296/1 S |
| 3,854,769 | 12/1974 | Saunders | 296/1 S |

*Primary Examiner*—M. H. Wood, Jr.
*Assistant Examiner*—David M. Mitchell
*Attorney, Agent, or Firm*—Oltsch & Knoblock

[57] ABSTRACT

An air deflector used in combination with a vehicle pulling a trailer. The air deflector is of a V-shaped, concave, two-bladed construction. The blades are attached to the vehicle in a spaced position above the vehicle roof and in front of the trailer so as to cause the air to be deflected around and over the front of the trailer as the vehicle pulls the trailer along the road.

7 Claims, 7 Drawing Figures

U.S. Patent   March 30, 1976   Sheet 1 of 3   3,947,065
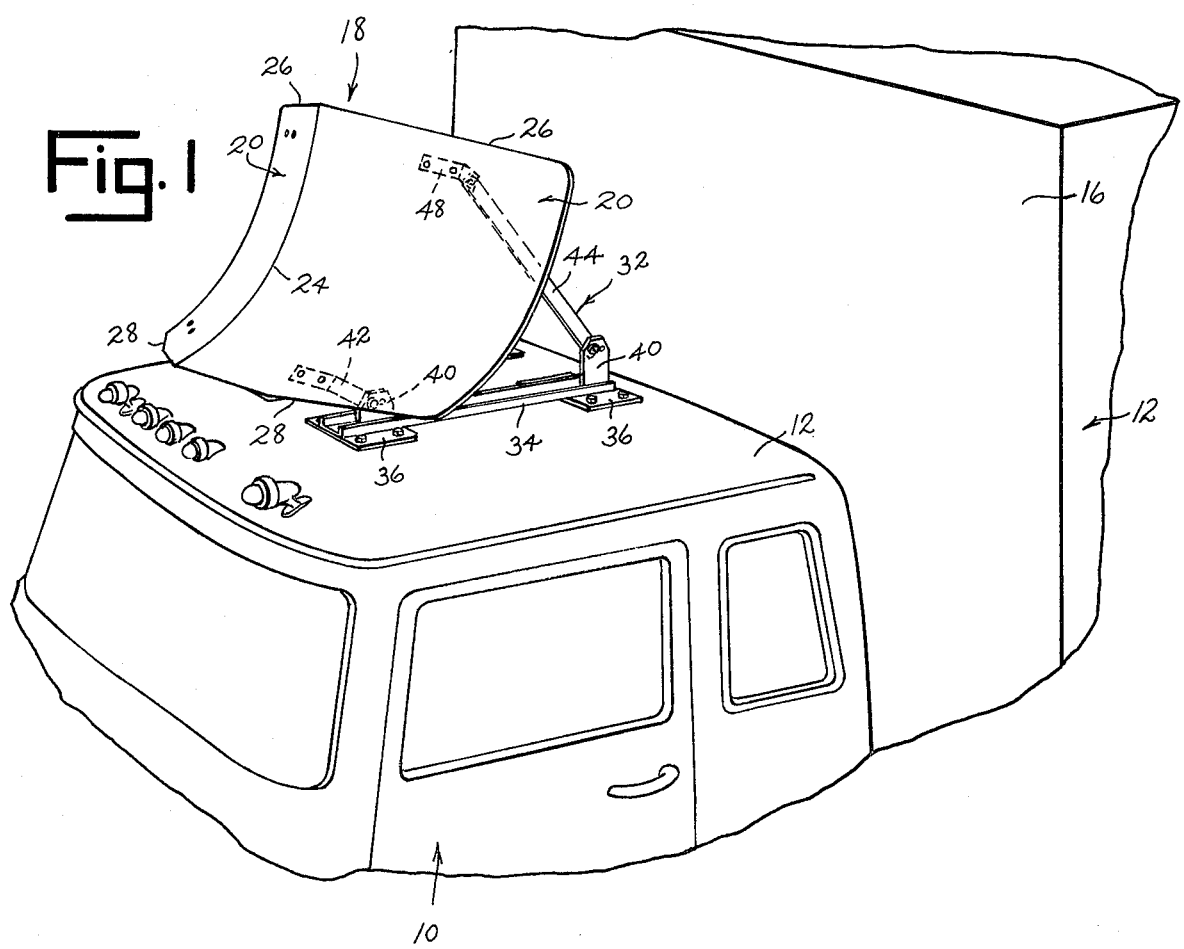
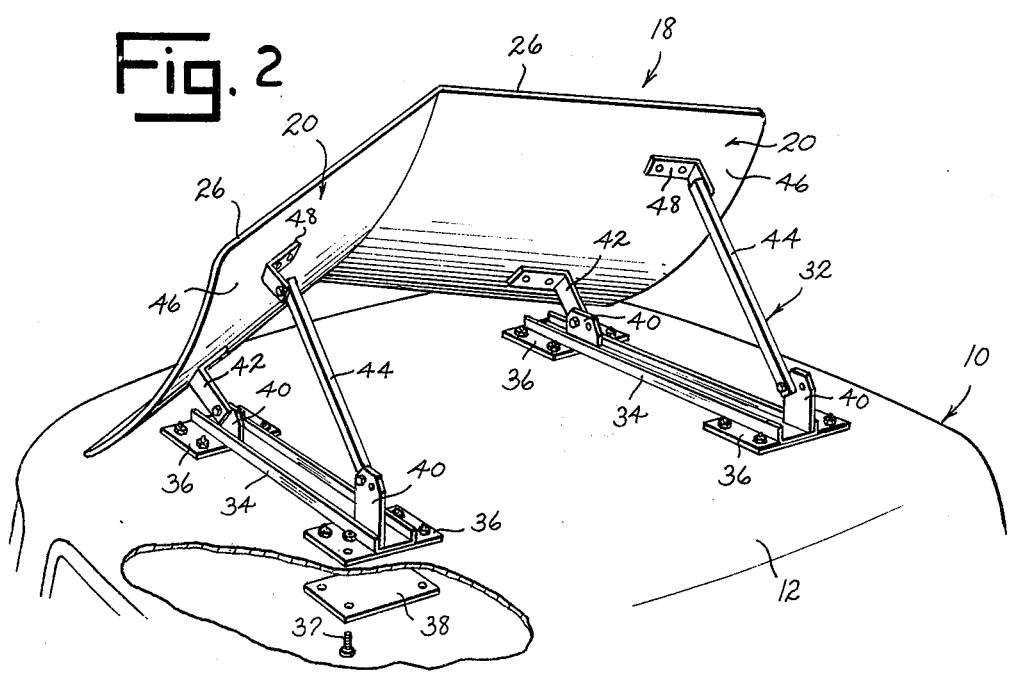

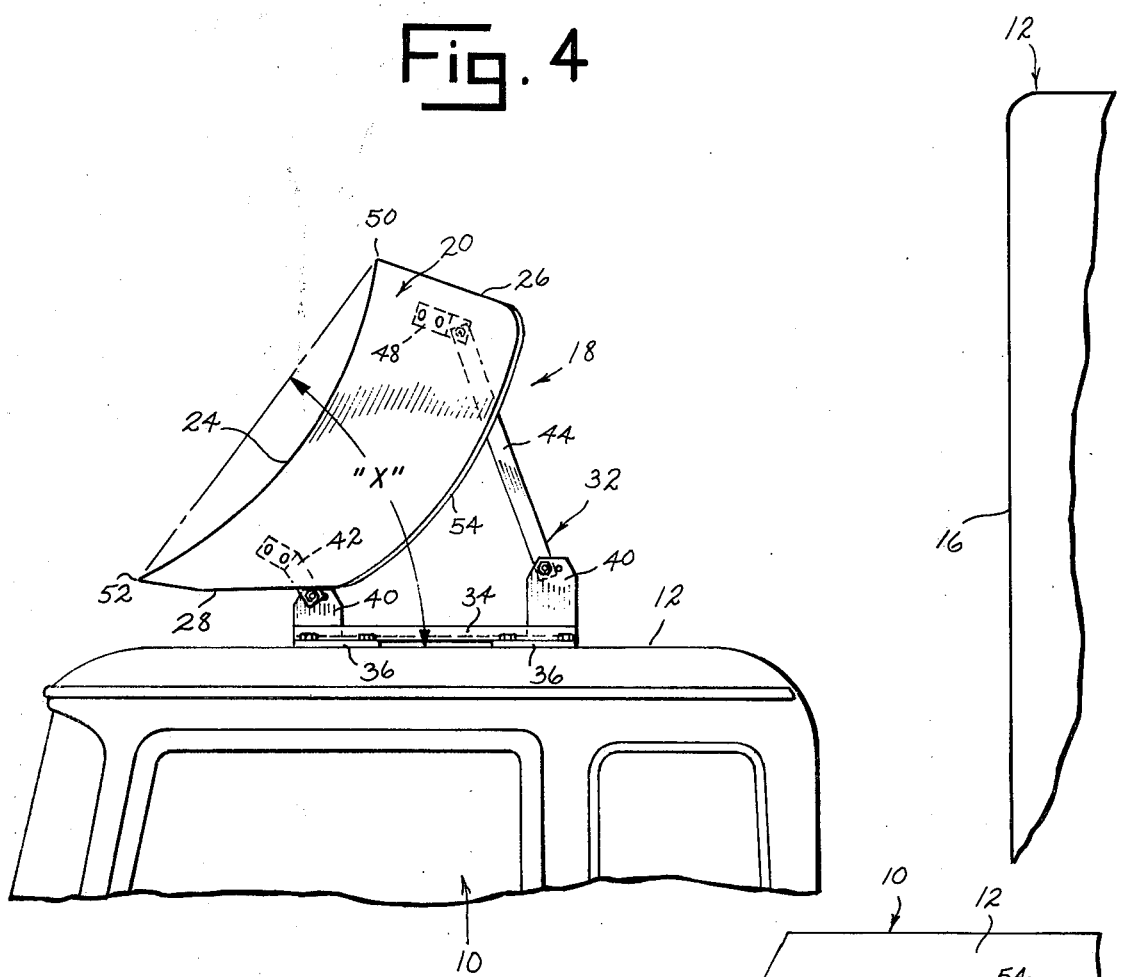
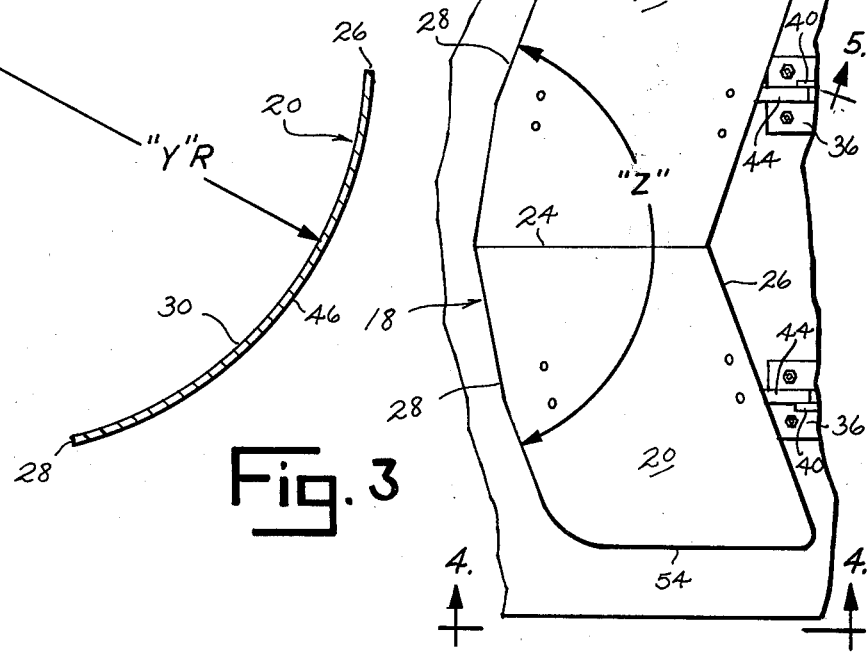

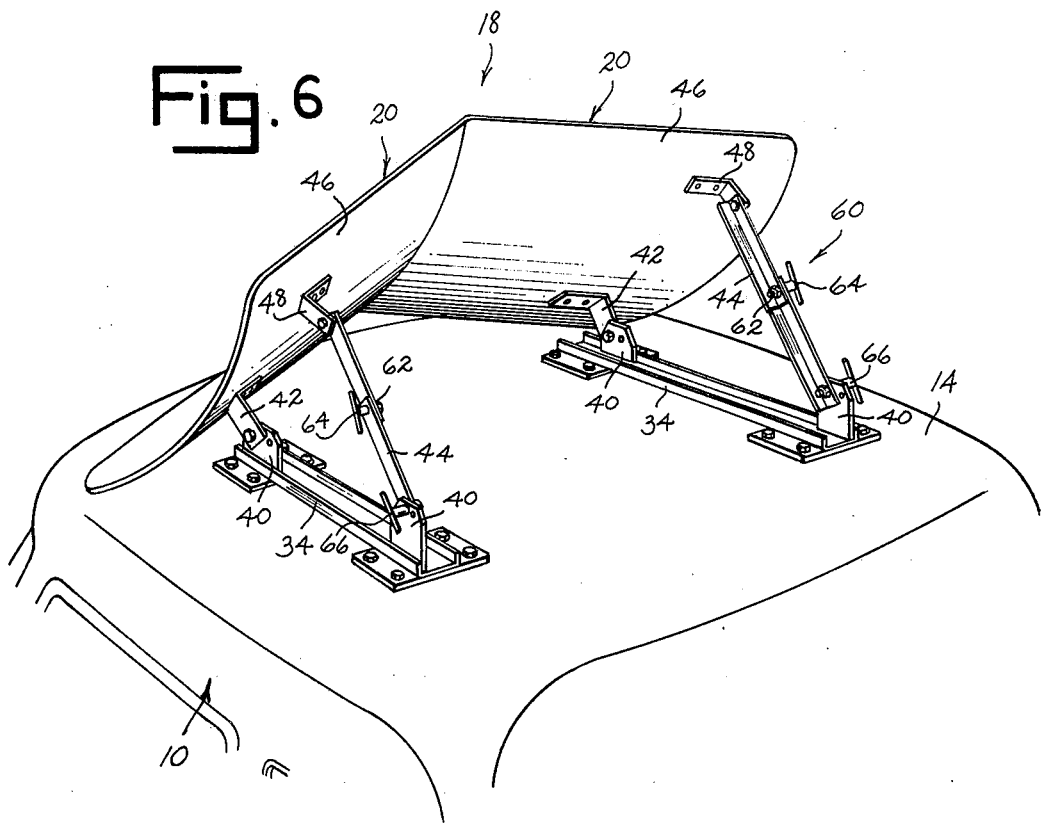
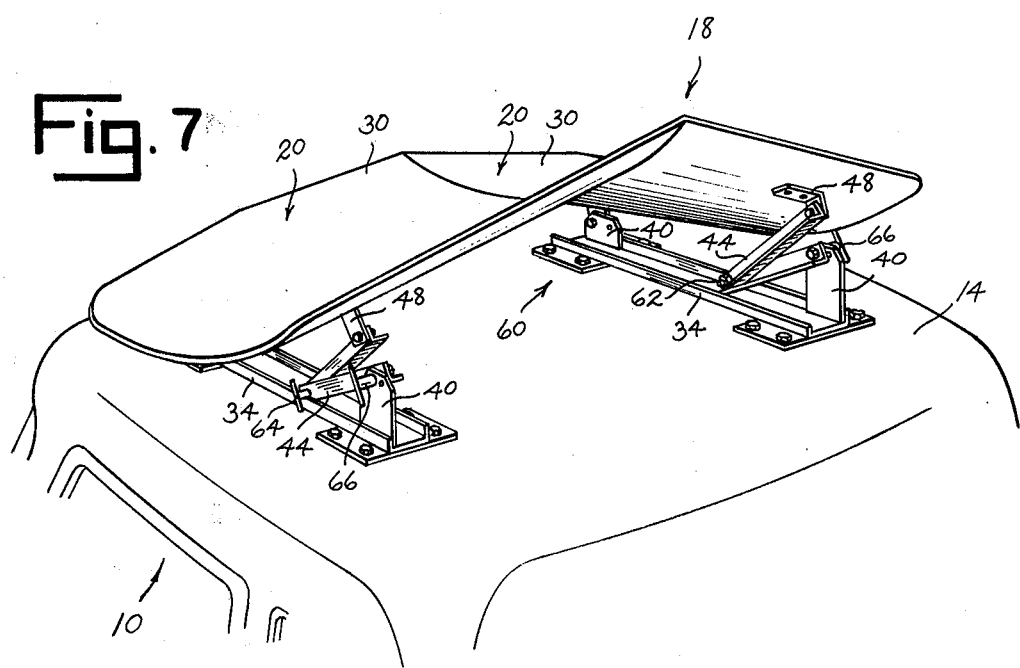

AIR DEFLECTOR FOR USE IN COMBINATION WITH A VEHICLE PULLING A TRAILER

SUMMARY OF THE INVENTION

This invention relates to an improved air deflector used in combination with a vehicle pulling a trailer.

The air deflector of this invention includes first and second blade members having a V-shaped, plow-defining configuration. Each blade member is concave. The blade members are secured to the towing vehicle in a spaced relationship above the roof thereof and are positioned forward of the front wall of the trailer so as to cause the air to be deflected laterally around and vertically over the trailer as the vehicle pulls the trailer along the road. Means may be provided for pivoting the blade members from the nearly vertical position employed when pulling the trailer to a lower nearly horizontal position when the trailer has been detached from the vehicle.

Accordingly, it is an object of this invention to provide an air deflector which when attached to the roof of a vehicle pulling a trailer improves the handling and fuel consumption rate of the vehicle.

Another object of this invention is to provide an air deflector having first and second concave blade members formed into a V- or plowed-shaped configuration which when connected above the roof of a vehicle towing a trailer serves to deflect the air around and over the trailer.

Still another object of this invention is to provide an air deflector which is mountable on the roof of a tractor and which improves the fuel consumption of the tractor when pulling a trailer and which improves the handling of the tractor when deadheading, that is when pulling an empty trailer.

Other objects of this invention will become apparent upon a reading of the invention's description.

BRIEF DESCRIPTION OF THE DRAWINGS

FIG. 1 is a perspective view of one embodiment of the air deflector of this invention shown attached to the roof of a tractor.

FIG. 2 is a perspective view of the air deflector of FIG. 1 as viewed from the rear with portions of the tractor roof broken away for purposes of illustration.

FIG. 3 is a top plan view of the air deflector of FIG. 1.

FIG. 4 is a side view of the air deflector of FIG. 1.

FIG. 5 is a sectional view of the deflector as taken along line 5—5 of FIG. 3.

FIG. 6 is a perspective view of a modified embodiment of the air deflector of this invention shown in its upper position as viewed from the rear.

FIG. 7 is a perspective view of the air deflector of FIG. 6 shown in its lower position.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

In FIGS. 1 and 4 a vehicle 10, shown to be a tractor pulling a trailer 12, is shown. Vehicle 10 includes a roof 14 which is located forwardly of front wall 16 of trailer 12. As best seen in FIG. 4, front wall 16 of trailer 12 protrudes above the level of vehicle roof 14 and would, without the aid of this invention, provide a large wind contacting surface which would serve to retard the forward progress or movement of the vehicle when towing trailer 12.

Air deflector 18 shown in FIGS. 1–5 includes a pair of blade members 20. Blade members 20 are joined at their leading edges 24 and diverge rearwardly with respect to the orientation of vehicle 10 in a divergent, plow-defining manner. Each blade member 20 has an upper edge 26 and a lower edge 28 and is concave at its front face 30, as best seen in FIG. 5. Blade members 20 are mounted to roof 14 of vehicle 10 with their lower edges 28 spaced above the level of the roof by means of a frame assembly 32. While the precise construction of frame assembly 32 may vary according to the type and configuration of vehicle roof, in the illustrated embodiment the assembly includes a pair of parallel elongated foot parts 34. Each foot part 34 is positioned so as to generally parallel the longitudinal dimension of vehicle 10 and is secured to roof 14 in a suitable manner such as by attachment plates 36 which are attached at the ends of the foot part. Plates 36 rest upon roof 14 and are affixed in position by means of bolts 37 which extend through hold down plates 38 located under the roof. Another suitable form for attaching foot parts 34 to roof 14 would be by welding each attachment plate 36 of the foot parts directly to the roof at reinforced roof portions. Upright brackets 40 are mounted at the ends of each foot part 34. A pair of braces 42 and 44 are each pivotally connected at one end to brackets 40 of each foot part 34. Braces 42 are located forwardly of braces 44 with respect to the direction of vehicle 10 and are connected to the rear faces 46 of blade members 20 near lower edges 28 of the members. Each brace 44 is connected at its opposite end by a bracket 48 to the rear face of a blade member 20 near the upper edge 26 of the member.

Blade members 20 are located by frame assembly 32 with their lower edges 28 preferably spaced between two and ten inches from the level of roof 14. Angle of incline "X" shown in FIG. 4 is preferably between 45° and 60°. Angle "X" is defined as that angle between the roof and a notional line passing through spaced points 50 and 52 which represent the intersection of leading edges 24 and the upper and lower edges 26 and 28 of the blade members. The vertical height of the deflector 18 as measured from spaced point 50 to lower edge 28 of blade members 20 may vary from 20 to 40 inches. The angle between blade members 20 designated by the letter "Z" in FIG. 3 is preferably 138° but may vary between 130° and 145°. The width of deflector 18 as measured horizontally between trailing edges 54 may be between 50 and 70 inches. The concavity of each blade member 20 as measured at its front face 30 and designated by the radius "Y" shown in FIG. 5 is preferably 21 inches for an inclination angle "X" of 51°, and 27 inches for an inclination angle "X" of 55°, and may vary between 20 and 28 inches. The precise angles and dimensions of blade members 20 and their location upon the vehicle roof will depend upon the difference in height between the roof of the vehicle and the roof of the trailer, the width of the trailer at its front wall 16, and the length of the vehicle roof and location of the windshield of the vehicle.

In an actual test utilizing air deflector 18, as above described, connected to the roof of a Diamond Reo tractor pulling a Strick trailer at 55.9 m.p.h., the mileage rate of the vehicle was 7.93 m.p.g. Without deflector 18, the mileage rate of the tractor-trailer at 55.9 m.p.h. dropped to 6.70 m.p.g. At 60.0 m.p.h. without the air deflector attached, the tractor-trailer experienced a mileage rate of 5.87 m.p.g. and with the air deflector attached the mileage rate increased to 7.19 m.p.g. At 63.0 m.p.h., the tractor-trailer without the air deflector attached experienced a 5.27 m.p.g. mileage rate, while with the air deflector attached the mileage rate increased to 6.84 m.p.g. The tests also noted improved handling and stability of the vehicle when deadheading at high speed and, especially, when coming out of banked curves. Additional testing and driver reaction has indicated that the air deflector of this invention causes the air to be deflected along the sides of the vehicle pulled trailer and over the top of the trailer with no appreciable eddies being formed or created between the deflector and the front wall of the trailer.

In FIGS. 6 and 7 a modified embodiment of the air deflector of this invention is shown. Blade members 20 in these figures are mounted to roof 14 of vehicle 10 by means of a collapsible frame assembly 60. Braces 42 which are connected to the rear faces 46 of blade members 20 are pivotally connected to the forwardly positioned brackets 40 of foot parts 34. Braces 44 are not of the rigid construction previously described for the embodiment of the air deflector shown in FIGS. 1–5, but instead are each of a two-piece collapsible form. Each collapsible brace 44 in FIGS. 6 and 7 is pivotally connected at one end to a bracket 48 of a blade member 20 and is pivotally connected at its opposite end to a rearwardly positioned bracket 40 of a foot part 34. Collapsible braces 44 are of an angle iron configuration and are of two-link construction with the links being pivotally connected together at 62. A T-shaped turn bolt 64 is provided at the connection 62 of the two links of each collapsible brace 44 so as to lock the links together in a straightened or selected angular position. Additionally, it is preferable to provide a T-shaped turn bolt 66 where each collapsible brace 44 is pivotally connected to its bracket 40. Frame assembly 60 allows deflector 18 to be shifted between an upper position as shown in FIG. 6 and a lower, collapsed position as shown in FIG. 7. Deflector 18 would be secured in its upper position when vehicle 10 is towing trailer 12. When the trailer has been disconnected from vehicle 10, deflector 18 would be collapsed as seen in FIG. 7. When in its collapsed or lowered position, the air deflector still has the front face 30 of each of its blade members 20 positioned so as to contact the oncoming wind upon vehicle movement but at a lesser angle than when the deflector is located in its upper position. This air contact at the blade members when the deflector is in its lower position serves to apply a downward pressure upon the rear axle of the vehicle which improves the stability and traction of the vehicle when "bobtailing", that is driving without the trailer.

It is to be understood that frame assemblies 60 and 32 may be constructed with their foot parts 34 shaped to accommodate vehicle roofs of various slope, dimension and configuration. Blade members 20 may be formed of a metal or fiberglass material with the frame assembly 32 or 60 being formed of metal strengthening members.

It is to be understood that the invention is not to be limited to the details above given but may be modified within the scope of the appended claims.

What I claim is:

1. An air deflector used in combination with a vehicle pulling a trailer, said vehicle including a roof, said trailer including a front wall located behind and extending above said vehicle roof, said deflector comprising first and second blade members each having leading and trailing edges and front and rear faces extending between said edges, said blade members being joined at their leading edges and extending divergently from said leading edges toward their trailing edges in a V-shaped configuration, said trailing edges being contained in substantially parallel longitudinally extending planes, each blade member having a concave front face with the joined leading edges of the members having a concave configuration, each blade member including upper and lower edges with the concavity thereof extending between said upper and lower edges and with the blade member being of substantially uniform concave cross section from its upper edge to its lower edge along its longitudinal dimension extending between its leading and trailing edges, said joined leading edges terminating at said upper and lower edges in upper and lower spaced points, frame means mounting said blade members to said vehicle roof in front of said trailer front wall with the lower edges of the blade members being spaced from said roof and with the joined leading edges of the blade members projecting toward the front of said vehicle, said lower spaced point being located forwardly of said upper spaced point of the blade members.

2. The air deflector of claim 1 wherein said trailer has a roof, said blade member upper edges spaced below the level of said trailer roof.

3. The air deflector of claim 1 wherein the angle between said vehicle roof and a line passing through said upper and lower spaced points is between 45° and 60°.

4. The air deflector of claim 3 wherein the concavity of each blade member at its front face is formed by a 20 to 28-inch radius.

5. The air deflector of claim 4 wherein the angle of diversion between said blade members as measured from said joined leading edges is between 130° and 145°.

6. The air deflector of claim 1 wherein said frame means includes two forward brace parts and two rearward brace parts, means connecting each forward brace part at one end to the rear face of a said blade member near the lower edge thereof and means securing each forward brace part at its opposite end to said vehicle roof behind said blade member, means connecting each rearward brace part at one end to the rear faces of a said blade member above a said lower brace part and means connecting each rearward brace part at its opposite end to said vehicle roof between said trailer and a said forward brace part.

7. The air deflector of claim 6 including means pivotally connecting each forward brace part to one of a said blade member and vehicle roof, means pivotally connecting the ends of each rearward brace part to a said blade member and vehicle roof, each rearward brace part being of a multiple link construction and including hinge means connecting the links for pivotal movement about said hinge means to pivot said blade members about the pivot connecting means of the forward pair of brace parts between upper and lower positions, lock means for rigidly coupling the links of each rearward brace part together after shifting said blade members into their upper or lower position.

* * * * *